Foster Monaco
Rosario Monaco
INVENTORS.

BY Karl F. Ross
Attorney

United States Patent Office 3,476,282
Patented Nov. 4, 1969

3,476,282
DISPLAY-TYPE FOOD SERVER
Foster Monaco and Rosario Monaco, both of 43—10 23rd St., Long Island City, N.Y. 11101
Filed Feb. 5, 1968, Ser. No. 702,968
Int. Cl. A47j 27/10; B65d 19/04
U.S. Cl. 220—13                                   7 Claims

ABSTRACT OF THE DISCLOSURE

Food-serving receptacle of the general type described in U.S. Patent No. 3,130,288 wherein a transparent inner vessel is suspended by a flange from a peripheral edge of a transparent outer vessel to form therewith a space for a temperature-controlling fluid enveloping the inner vessel and wherein a dome-shaped transparent cover fits over the two vessels, the flange of the inner vessel being tray-shaped to form a depressed seat for the cover and, alternatively, for the bottom of a second outer vessel to be stacked upon the first one.

---

Our present invention relates to a food-serving receptacle in which an outer vessel and an inner vessel form a space for a temperature-controlling fluid enveloping the inner vessel to chill or to heat the contents thereof, as generally disclosed in our prior Patents Nos. 3,130,288 and 3,241,706.

An object of this invention is to provide a food server of the type referred to whose units can be more conveniently stacked, either in their assembled state or with separate nesting of the inner and the outer vessels.

It is also an object of our present invention to provide a set of stackable units of this type which, when properly fitted together, can be used to serve a variety of foods under sanitary conditions and in full view of the consumer.

These objects are realized, in accordance with our instant improvement, by the provision of a receptacle of the aforedescribed type having one or more inner vessels suspended by their peripheral flanges from the upper peripheral edge of an outer vessel which may be divided into several compartments accommodating more than one inner vessel, the flanges of the inner vessel being tray-shaped and forming an all-around depression adapted to receive either a dome-shaped cover or the bottom of another outer vessel to be stacked on top of the receptacle upon removal of its cover or covers.

Advantageously, from the viewpoint of space utilization as well as attractiveness and easy handling, at least the inner vessels are of square outline whereas the other vessels and their compartments are of downwardly converging frustoconical shape, with the upper edge of the outer vessel defining one or more mouths which are wider than the bottom of that vessel or of each compartment thereof whereby several such vessels can be readily nested in a stack upon removal of the inner vessels. For this purpose, in the case of an outer vessel divided into several compartments, the latter are interconnected only in the region of the upper edge so that each compartment bottom can be received in a respective mouth of an identical vessel.

The invention will be described in greater detail hereinafter with reference to the accompanying drawing in which.

Figure 1:
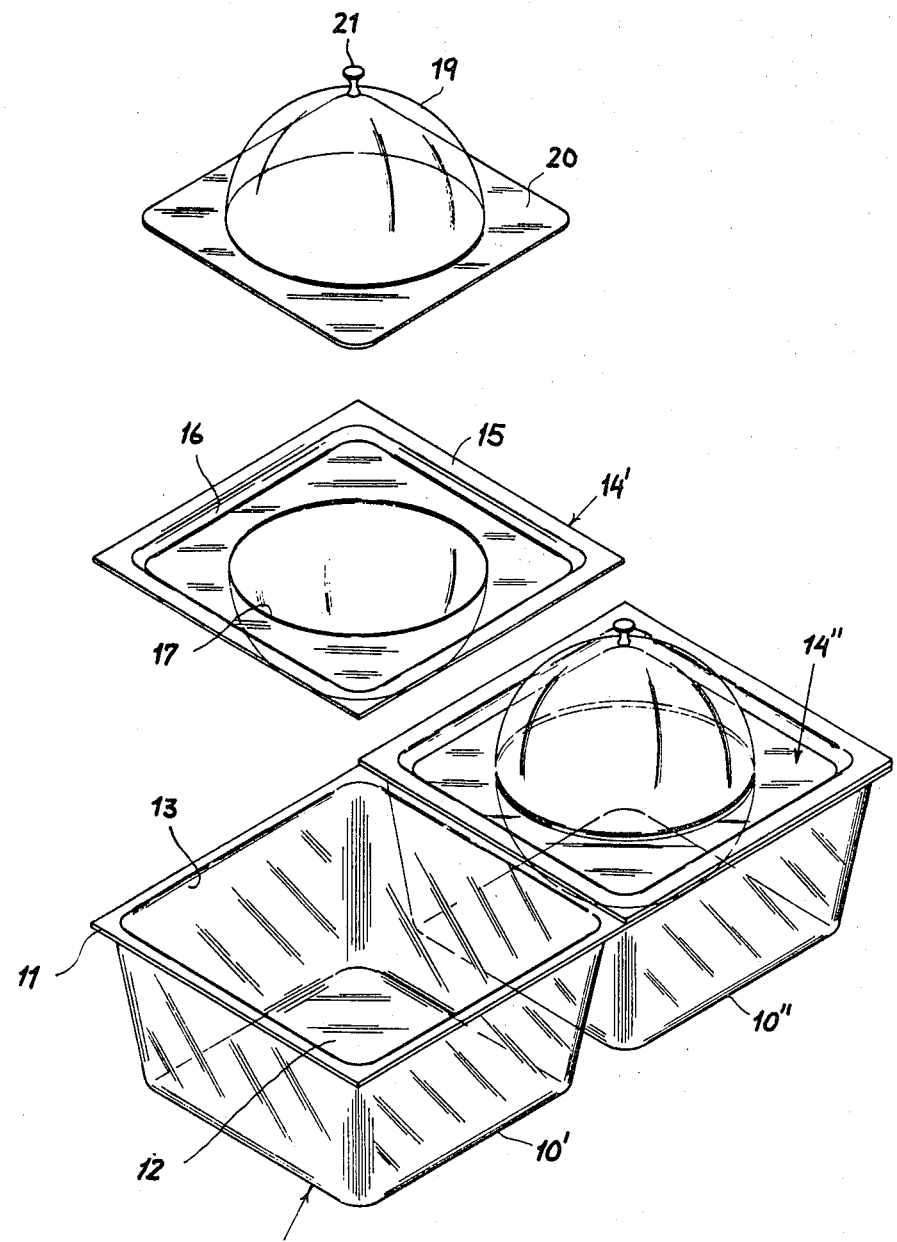
FIG. 1 is a partly exploded perspective view of a food server according to the invention.

The assembly shown in FIG. 1 comprises an outer vessel 10 of transparent plastic material divided into two separate compartments 10', 10" each having the shape of a downwardly converging regular four-sided frustopyramide. Vessel 10 has a continuous upper edge 11 of rectangular shape which frames and physically interconnects the two compartments. The draft of each compartment is such that the bottom 12 thereof is readily receivable in the mouth 13 of an identical vessel as illustrated in FIG. 2 where several such dual outer vessels have been illustrated at 10a, 10b, 10c.

Figure 3:
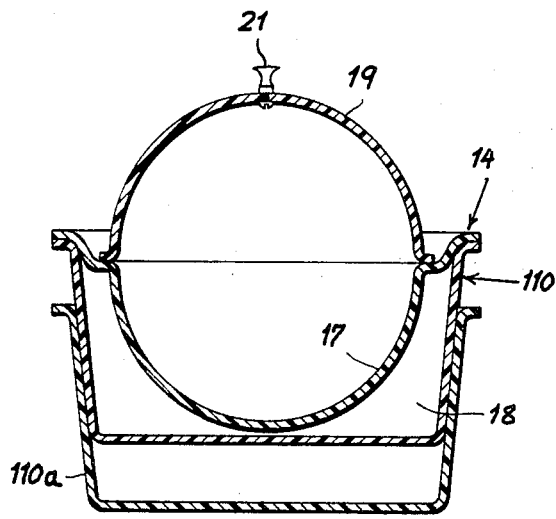
FIG. 3 shows a set of single-compartment vessels in nested condition.
Figure 2:
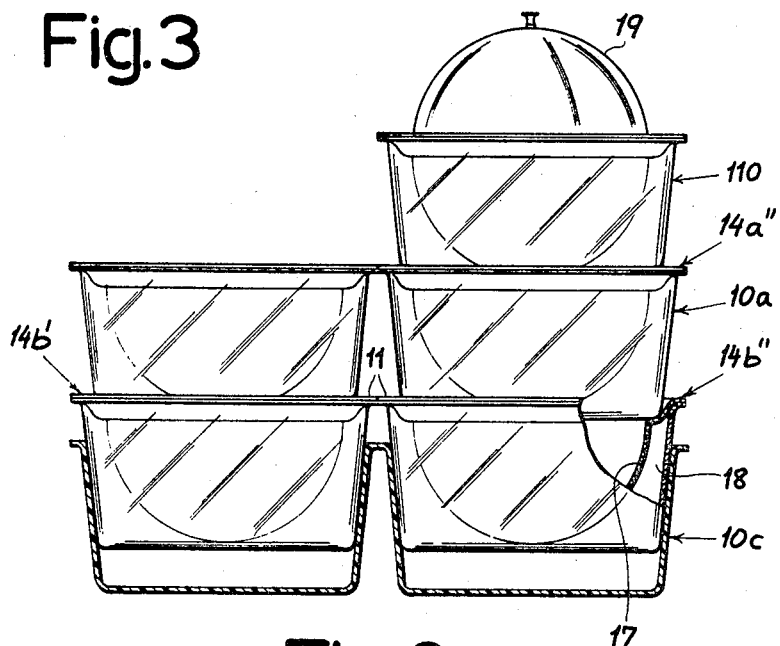
FIG. 2 is an elevational view, partly in section, of some of the components of the assembly of FIG. 1 together with further units nested therewith to form a stack.

A pair of inner vessels 14', 14" interchangeably fit in the two compartments 10', 10" of outer vessel 10, each of these inner vessels having a tray-shaped flange 15 of square shape forming a depression 16 all around a hemispherical bowl 17 which in use extends to nearly the bottom of the outer vessel, thereby defining with it a fluid space 18 as best illustrated in FIGS. 2 and 3. Space 18 is adapted to receive a heating or cooling fluid (e.g. in water) to control the temperature of foodstuffs held in bowl 17 during and prior to serving, the bowl being normally closed by a dome-shaped lid 19 having a square flange 20 which fits into the depression 16 and whose dimensions therefore correspond to those of bottom 12. As best illustrated in FIG. 3, dome 19 has the same radius as bowl 17 so as to complement the latter to a sphere. A handle 21, e.g. of metal, projects from the dome.

As shown in FIG. 2, vessel 10b is directly received in vessel 10C and in turn supports a similar vessel 10a through the intermediary of the tray-shaped flanges 11 of a pair of inner vessels 14b', 14b". In similar manner, an outer vessel 110 comprising a single compartment may be received in the depressed part of the flange of an inner vessel 14a" nested in one of the compartments of vessel 10a. Vessel 110, as also illustrated in FIG. 3, accommodates a single inner vessel 14 with its cover 19 and is also receivable in a similar outer vessel 110a.

Since all the components described above (with the exception of handle 21) are of transparent plastic material, the food present in any of the bowls 17 of inner vessels 14 etc. is clearly visible while being protected against the atmosphere by either an overlying vessel or a cover 19, except at the time of serving when the cover or the overlying vessel is lifted off. It is also to be noted that our improved food server is highly versatile in the manner of the assembly of its subdivisions and that the stacking of the outer vessels 10b, 10c or 110, 110a requires only a minimum of space; in like manner, the inner vessels can also be nested together to form a stack of small height. Naturally, the number of compartments in an outer vessel may be extended beyond the pair illustrated.

The hemispherical shape of the bowl accommodates a maximum quantity of food in a minimum volume and provides the greatest clearance for the fluid to be introduced into the space 18. The square outlines of the inner vessels and the covers enables their seating in any of four different positions.

Minor structural modifications of the arrangement described and illustrated are intended to be embraced within the spirit and scope of our invention.

We claim:

1. A display-type of food-serving receptacle comprising an upwardly open outer vessel of transparent material terminating in a rectangular upper peripheral edge; an upwardly open inner vessel of transparent material fitting with all-around clearance in said outer vessel, said inner vessel being provided at its top with a rectangular tray-shaped peripheral flange forming an all-around depression and a generally hemispherical receptacle portion surrounded by said flange, said flange being engageable with said upper edge for removably suspending said inner vessel within said outer vessel; and a generally dome-shaped cover of transparent material overlying both said vessel, said cover being removably seated in said depression with its dome registering with said receptacle portion.

2. A receptacle as defined in claim 1 wherein said outer vessel is of generally frustopyramidal configuration and converges downwardly toward a bottom receivable in said depression upon removal of said cover and positioning of said outer vessel above said inner vessel of a like receptacle.

3. A display-type of food-serving receptacle comprising an upwardly open outer vessel of transparent material terminating in a rectangular upper peripheral edge; an upwardly open inner vessel of transparent material fitting with all-around clearance in said outer vessel, said inner vessel being provided at its top with a tray-shaped peripheral flange forming an all-around depression, said flange being engageable with said upper edge for removably suspending said inner vessel within said outer vessel; and a generally dome-shaped cover of transparent material overlying both said vessels, said cover being removably seated in said depression, said outer vessel being of generally frustopyramidal configuration and converging downwardly toward a bottom receivable in said depression upon removal of said cover and positioning of said outer vessel above said inner vessel of a like receptacle, said outer and inner vessels being of square outline, said inner vessel having a generally hemispherical central portion formed by said peripheral flange.

4. A receptacle as defined in claim 3 wherein said edge defines a mouth wider than said bottom of the outer vessel whereby a plurality of such outer vessels may be nested in a stack.

5. A receptacle as defined in claim 3 wherein said dome-shaped cover substantially complements said inner vessel to complete a sphere with said central portion.

6. A display-type of food-serving receptacle comprising an upwardly open outer vessel of transparent material terminating in a rectangular upper peripheral edge; an upwardly open inner vessel of transparent material fitting with all-around clearance in said outer vessel, said inner vessel being provided at its top with a tray-shaped peripheral flange forming an all-around depression, said flange being engageable with said upper edge for removably suspending said inner vessel within said outer vessel; and a generally dome-shaped cover of transparent material overlying both said vessels, said cover being removably seated in said depression, said outer vessel being divided into a plurality of juxtaposed compartments of generally square outline, said inner vessel being generally hemispherical and receivable in any one of said compartments.

7. A receptacle as defined in claim 6 wherein each of said compartments is of generally frustopyramidal configuration and converges downwardly toward a bottom receivable in said depression upon removal of said cover and positioning of said outer vessel above the inner vessel of another similar receptacle, said compartments being interconnected only at the level of said upper edge whereby a plurality of such outer vessels may be nested in a stack.

References Cited

UNITED STATES PATENTS

| | | | |
|---|---|---|---|
| 1,311,990 | 8/1919 | Moller | 220—17 |
| 3,241,706 | 3/1966 | Monaco et al. | 220—17 |
| 3,269,578 | 8/1966 | Lewis | 220—82 |
| 3,386,608 | 6/1968 | Diller | 220—23.8 |

FOREIGN PATENTS 312,737  6/1929  Great Britain.

JOSEPH R. LECLAIR, Primary Examiner
JAMES R. GARRETT, Assistant Examiner

U.S. Cl. X.R.

220—17, 23.6, 23.8